UNITED STATES PATENT OFFICE.

JOSEPH G. GOSHON AND SAMUEL M. EBY, OF SHIRLEYSBURG, PA.

PREPARATION OF MAIZE-LEAF AS A SUBSTITUTE FOR TOBACCO.

Specification forming part of Letters Patent No. 12,417, dated February 20, 1855.

*To all whom it may concern:*

Be it known that we, JOSEPH G. GOSHON and SAMUEL M. EBY, of Shirleysburg, in the county of Huntingdon and State of Pennsylvania, have invented a new and useful Preparation of the Leaf of Indian Corn; and we do hereby declare that the following is a full, clear, and exact description of the same.

The object of our invention is the preparation of the leaf of Indian corn in a form similar to the various preparations of tobacco, so that it may be used instead thereof by persons addicted to the practice of chewing and smoking, with the effect of strengthening the system instead of debilitating it. The foundation of this preparation is the blade or leaf of Indian corn, gathered when the plant is about three feet high and submitted to the following process: After cutting the blades are thrown into heaps, and when sufficiently wilted are hung upon frames or lines to dry. After drying the leaf is dipped in warm water and its middle portion or string removed. Cornstalks, gathered at any time before frost and cut fine, are then boiled with a sufficient quantity of water to reduce the central parts of the stalk to a pulp and form a sirup, to which is added quassia and capsicum or other bitter botanical production, in the proportions hereinafter to be stated. The blades after preparation as above are then placed in this sirup and allowed to simmer and soak until well filled with the mixture. They are then taken out and submitted to the same process as tobacco, for manufacture into plugs, cigars, or cut. The preparation is to be used in the same manner as tobacco. The quassia and capsicum are used in the proportion of four ounces of the former and one-half ounce of the latter to a pound of the corn-leaf.

What we claim as our invention, and desire to secure by Letters Patent, is—

Preparing the leaf of Indian corn substantially as hereinbefore set forth, for the purposes specified.

In testimony whereof we have hereunto signed our names before two subscribing witnesses.

J. G. GOSHON.
S. M. EBY.

Witnesses:
GEO. PATTEN,
SAML. GRUBB.